United States Patent
Haberer et al.

(10) Patent No.: US 8,933,593 B2
(45) Date of Patent: Jan. 13, 2015

(54) DISTANCE MEASURING OPTOELECTRONIC SAFETY SENSOR AND METHOD OF MONITORING A MONITORED ZONE

(75) Inventors: Manfred Haberer, Riegel (DE); Bernd Rothenberger, Rheinhausen (DE)

(73) Assignee: Sick AG, Waldkirch (DE)

(*) Notice: Subject to any disclaimer, the term of this patent is extended or adjusted under 35 U.S.C. 154(b) by 924 days.

(21) Appl. No.: 13/087,537

(22) Filed: Apr. 15, 2011

(65) Prior Publication Data

US 2011/0273723 A1 Nov. 10, 2011

(30) Foreign Application Priority Data

May 4, 2010 (EP) .................................... 10161809

(51) Int. Cl.
*H02H 11/00* (2006.01)
*G01S 17/02* (2006.01)
*F16P 3/14* (2006.01)
*G01S 7/481* (2006.01)
*G01S 17/42* (2006.01)
*G01S 17/87* (2006.01)

(52) U.S. Cl.
CPC ................ *G01S 17/026* (2013.01); *F16P 3/14* (2013.01); *G01S 7/4817* (2013.01); *G01S 17/42* (2013.01); *G01S 17/87* (2013.01)
USPC ........................................................ 307/326

(58) Field of Classification Search
USPC ........................................................ 307/326
See application file for complete search history.

(56) References Cited

U.S. PATENT DOCUMENTS

| 7,504,987 | B2 | 3/2009 | Oka et al. | |
| 8,039,031 | B2* | 10/2011 | Baianu et al. | 426/233 |
| 2001/0041077 | A1* | 11/2001 | Lehner et al. | 396/661 |

(Continued)

FOREIGN PATENT DOCUMENTS

| DE | 28 18 942 A1 | 11/1979 |
| DE | 101 52 543 A1 | 5/2003 |

(Continued)

OTHER PUBLICATIONS

Freseu, U. et al., "Verfahren zur Vermeidung von Kollisionen gesteuert beweglicher Teile einer Anlage", German Research Center for Aritficial Intelligence (DFKI GbmH), 31 pages, (Apr. 2009) XP-002583617.
European Search Report, issued Oct. 22, 2010 in the counterpart Application No. 10161809.8, seven (7) pages.

*Primary Examiner* — Jared Fureman
*Assistant Examiner* — Duc M Pham
(74) *Attorney, Agent, or Firm* — Nath, Goldberg & Meyer; Jerald L. Meyer; Katelyn J. Bernier

(57) ABSTRACT

A distance measuring optoelectronic safety sensor (10) for monitoring a monitored zone (18) having at least one protected zone (48) is provided, wherein the safety sensor (10) has a light receiver (24) for generating a received signal on light reception from the monitored zone (18) as well as an evaluation unit (30, 32) which is designed to detect objects (52) in the monitored zone (18) with the aid of the received signal and to determine their position, including their distance from the safety sensor (10), and to output a securing signal on recognition of an unpermitted object intrusion (52) into a protected zone (48). In this respect, the evaluation unit (30, 36) is designed to determine and output the distance of detected objects (52) from the protected zone (48).

15 Claims, 3 Drawing Sheets

(56) References Cited

U.S. PATENT DOCUMENTS

Figure 1:
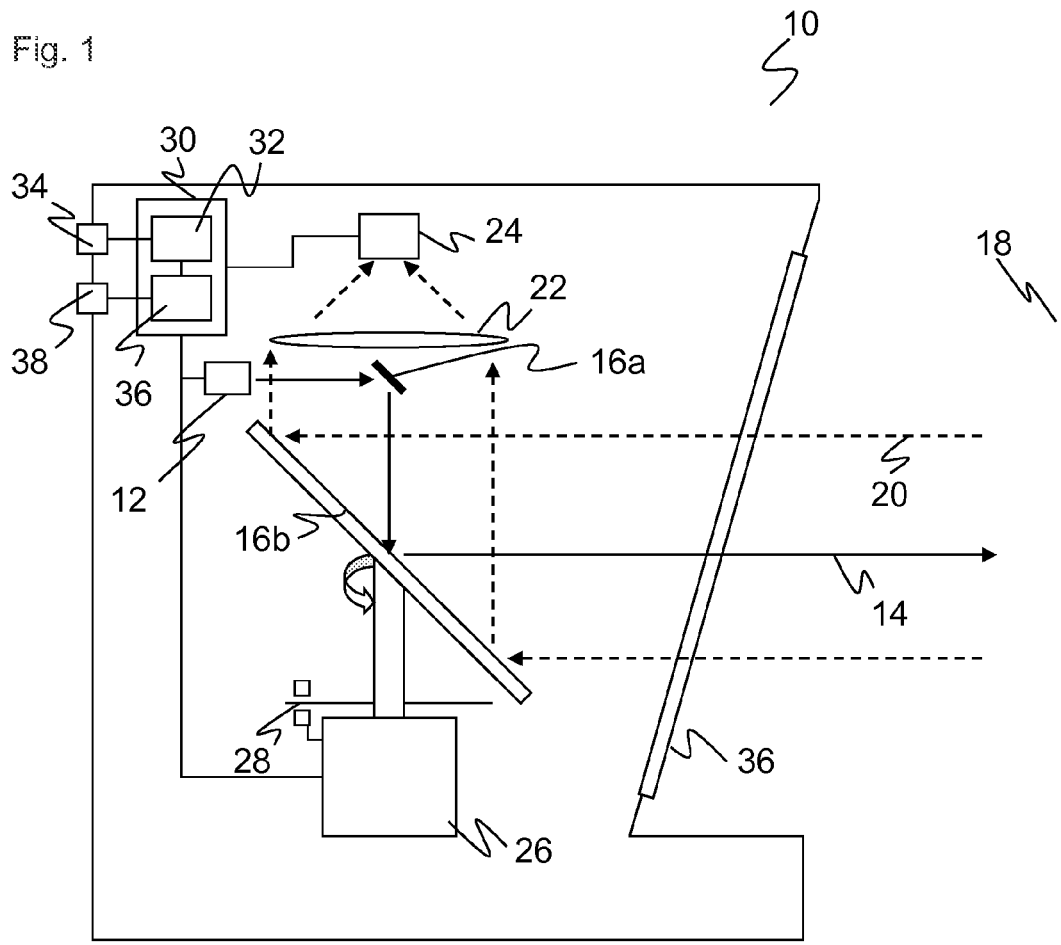

2006/0049340 A1* 3/2006 Haberer et al. ............... 250/221
2006/0067579 A1* 3/2006 Pirkl et al. .................... 382/190
2011/0050878 A1* 3/2011 Wells et al. ..................... 348/86

FOREIGN PATENT DOCUMENTS

| DE | 103 24 628 A1 | 12/2004 |
| DE | 10 2004 043 515 A1 | 3/2006 |
| EP | 1 635 107 A1 | 3/2006 |

* cited by examiner

DISTANCE MEASURING OPTOELECTRONIC SAFETY SENSOR AND METHOD OF MONITORING A MONITORED ZONE

The invention relates to a distance measuring optoelectronic safety sensor and to a method of monitoring a monitored zone in accordance with the preamble of claim 1 or claim 12 respectively.

An important technical safety application of optoelectronic sensors is the securing of machines which form a source of danger. In this respect, the sensor monitors a protected field which may not be entered by an operator during the operation of the machine. If the sensor recognises an unpermitted intrusion into the protected field, for instance a leg of an operator, it triggers an emergency stop of the machine. Other intrusions into the protected field, for example by static machine parts, can be taught as permitted in advance.

Some of these sensors are distance measuring, that is they do not only recognise objects per se, but also their distance. These sensors include a safety laser scanner such as described in DE 43 40 756 A1. A light beam generated by a laser periodically sweeps over a monitored zone with the help of a deflection unit. The light is remitted at objects in the monitored zone and is evaluated in the scanner. A conclusion is drawn from the angular position of the deflection unit on the angular position of the object and from the time of flight of light additionally on the distance of the object from the laser scanner while using the speed of light. In this respect, two general principles are known to determine the time of flight of light. In phase-based processes, the transmitted light is modulated and the phase shift of the received light with respect to the transmitted light is evaluated. In pulse-based processes, such as are preferably used for laser scanners in safety technology, the laser scanner measures the time of flight until a transmitted light pulse is received again. Since the laser scanner acquires angle and distance information, two-dimensional positions of objects in the monitored zone can be determined.

Another group of examples is formed by 3D cameras which are known in different technologies. A stereoscopic camera system takes two or more images of a scenery from different angles of view, orders structures of the different images to one another and triangulates their distance from the disparity, that is the apparent displacement of the structures, and on the basis of the known perspectives. With a time of flight camera, a light signal is actively transmitted and the time of flight up to the reception of the light remitted from the scenery is determined for each pixel, for example by means of photon multiplicity detection. Due to the known and constant speed of light, this also supplies a three-dimensional distance map. Image sensors are known in whose intelligent pixels the time of flight determination is integrated.

As the last example, scanning light grids can be named in which, unlike in a conventional light grid, the individual rays are formed as distance measuring light scanners in accordance with one of the already outlined time of flight processes.

Sensors used in safety technology have to work particularly reliably and must therefore satisfy high safety demands, for example the EN13849 standard for safety of machinery and the machinery standard EN61496 for electrosensitive protective equipment (ESPE). A number of measures have to be taken to satisfy these safety standards such as reliable electronic evaluation by redundant, diverse electronics, function monitoring and/or provision of individual test targets with defined degrees of reflection which have to be recognised at the corresponding scanning angles.

Distance measuring safety sensors allow a geometrical configuration of the protected fields. For this purpose, the user defines the desired shape and position of the protected fields in a configuration program before the actual operation and these are then converted and uploaded to the sensor. It is known to switch over between a plurality of protected field configurations in operation in order to adapt to the respective process step. Every single one of these protected field configurations must, however, be carried out by the user in advance with great effort. Particularly with more complex applications in which the protected fields should be adapted to a plurality of parameters such as the speed and the carried bearing load of an automated guided vehicle (AGV), this is at least arduous and sometimes no longer practical.

It is furthermore usual to position a warning field in front of every protected field, with intrusions into a warning field initially only resulting in a warning or in a precautionary measure such as a reduced speed to prevent the intrusion into the protected field and thus the securing in good time and thus to increase the availability of the plant. The configuration effort is then again increased considerably since an associated warning field also has to be configured for each protected field.

It is known from EP 1 635 107 B1 to adapt protected fields dynamically to data of the machine control of the machine to be monitored. This, however, requires a very complex programming whose effort cannot be afforded for individual applications in the field and which is therefore often too expensive and inflexible.

EP 2 048 557 A1 discloses a mobile apparatus whose current position is automatically detected by a sensor and with which the desired protected field boundaries can thus be drawn in a configuration mode directly at the machine to be secured. This is admittedly a very intuitive and simple method to configure a protected field, but it does not eliminate the general need, as with the other configuration processes, to have to teach all desired protected field configurations together with associated warning fields in advance.

It is therefore the object of the invention to further develop a distance measuring safety sensor such that the configuration of protected fields and warning fields is further facilitated.

This object is satisfied by a safety sensor and by a method for monitoring a monitored zone in accordance with claim 1 and claim 12 respectively. In this respect, the invention starts from the basic idea of not defining the protected fields and warning fields completely in advance, but of adapting their basic structure flexibly in operation. Instead of rigid warning fields to be preconfigured, an output of the distance of detected objects from the protected zone takes place In accordance with the invention. The plant control to which the safety sensor is connected can then itself decide whether this distance should result in the initiation of a warning function or not.

The invention has the advantage that a warning field configuration can be completely dispensed with. The user or the connected control is given a quantitative evaluation of the environment with respect to the object distances and can thus react flexibly to the approach of a person or generally to a potential danger situation. The distance information is, however, not only of interest from a technical safety aspect, but can also be used for automation functions. The distance from a lateral wall can, for example, be a parameter which is not necessarily relevant to safety, but nevertheless important on the travel of an automated guided vehicle.

The position of the object determined by the safety sensor can be a two-dimensional position such as, for example, a laser scanner determines by means of angle and distance, but also a three-dimensional position, for instance from the three-dimensional image data of a 3D camera. The distance from the protected field can in another respect also be calculated into the protected field; that is no warning function then results, but rather information on how far an intrusion is taking place into a protected zone.

The protected zone is preferably a two-dimensional protected field whose boundary can be predefined for the evaluation unit using sampling points and series of curves connecting the sampling points. A protected field is generated from simple predefined values in the safety sensor in this manner. The series of curves with which the sampling points are to be connected do not have to be communicated, but are rather known to the participants, that is to the evaluation unit and to the external unit, for example a plant control. This is the simplest when straight line pieces and not other conceivable curved pieces such as Bezier curves connect the sampling points, that is overall a polygon series can be defined. A commonly used communication interface of the safety sensor with its safety protocol namely has a very limited bandwidth which does not allow a communication of complete protected fields during operation at all in most cases. On definition of the protected fields with reference to usually only some few sampling points, only a few data have to be communicated for the sampling points themselves, for which the bandwidth is sufficient.

The evaluation unit is preferably designed to determine and output the distance of detected objects from the protected zone only once per curve series and/or only once per sampling point. This likewise reduces the bandwidth requirement for the distances of detected objects from the protected field to very few data. One can imagine defining the distances only in a few classes, for example with 2 bits as very near, near, intermediate and far, and at the latest with 8 bits or 16 bits, the spacing can be classified or resolved finely enough for most applications. In this respect, the spacing per curve series is preferably the length of the perpendicular from the object on the curve series and the spacing per sampling point is the radial distance from the object to the sampling point. Despite the small quantity of data, the user can make a better decision with respect to the process control by the distance information for each protected zone section.

The evaluation unit is further preferably designed automatically to add further sampling points or automatically to remove sampling points. The evaluation unit in this manner adapts the protected fields defined by user presets, for example to exclude a known object from the protected zone. Such automatic adaptations of protected fields either have to follow such clear rules that their technical safety harmlessness is guaranteed or the user has to agree to the adaptations. It is also conceivable under these conditions to have defined sampling points displaced by the evaluation unit.

Changes in the position of sampling points, new sampling points and/or sampling points to be removed can preferably be defined for the evaluation unit during the ongoing securing operation so that the evaluation unit thereupon continues to work with the newly generated protected zone. Not only the communication from the safety sensor to the outside is thus expanded, but also the control possibility of the sensor itself. Instead of only calling up a protected field configuration stored in a completed state in the safety sensor as usual on a switching over of the protected fields, the present protected fields are dynamised by an external preset during the ongoing operation. This is conventionally not possible at all because the communication interface does not provide the required bandwidth for the transmission of complete protected fields. In accordance with the invention, it is not the protected field which is transmitted, but only the sampling points from which the evaluation unit generates the protected field itself. The protected zone geometry is thus adapted to the danger in ongoing operation using only a few parameters.

The protected zone is preferably a three-dimensional protected area zone whose boundary can be defined for the evaluation unit using a triangular net, with the evaluation unit in particular being designed to output the distance of detected objects from the protected area zone only once per triangle, or with additional or amended triangles or triangles to be removed being able to be defined for the evaluation unit during the ongoing securing operation. The distance is then, for example, calculated as a perpendicular on the respective triangular surface through the incentre. Instead of a triangular network, other descriptions of a 3D surface can also be used, with a respective distance from the individual surfaces, edges and/or corners being output, for example.

The evaluation unit is preferably designed to output speeds at which objects approach the protected zone or distance themselves from the protected zone. The speed can be calculated from the history of the distance data and from the elapsed time and allows warning functions which are substantially better adapted since an object fast approaching a protected zone boundary is substantially more dangerous than a slow object or particularly an object moving away.

The evaluation unit is preferably designed to treat at least one protected zone as a mute protected zone and thus to treat it as a purely measuring zone in which no evaluation for unpermitted object intrusions takes place for the mute protected zone. The term protected zone is somewhat misleading for these additional mute protected zones since they are purely measuring zones without a safety function. The term mute protected zone is selected because its other properties correspond to a protected zone, in particular with respect to the possibilities for dynamising its boundaries and the output of distance data. A measuring zone can, on the other hand, extend completely differently from the danger zone to be secured, with more or fewer sampling points being defined than an actual protected zone and being evaluated in a different frequency. In addition, both known and unknown objects are permitted in the measuring zone since the measuring zone is not relevant to safety. The distance data of the measuring zone can nevertheless be used as supports for warning functions.

The safety sensor is preferably a 3D camera, a distance measuring safety laser scanner or a scanning light grid. These sensors permit the definition of protected zones with large geometrical choice options.

In a further development of the invention, a system hast at least two of the safety sensors in accordance with the invention, with the evaluation unit being deigned to convert the perspectives of the safety sensors into one another. For this purpose, the safety sensors are automatically or manually registered with respect to one another in order to agree on a common coordinate system. A single safety sensor having an expanded field of view or better viewing angles is created in this process from the viewpoint of the user. The evaluation unit of the individual safety sensors can in this respect be reduced to just the detection. The further evaluation, for example with respect to protected zone infringements, distances from the protected zone or the dynamising of the protected zones can likewise take place in any internal evaluation unit, but can also be transposed exclusively or distributed to only one of the evaluation units or an external evaluation unit.

The evaluation unit is preferably designed to distribute the protected zones to the safety sensors such that no securing gaps arise. The user furthermore only defines the basic structure of the desired protected zone. The system relieves him from having to ensure that the protected field can be monitored by the plurality of safety sensors without shadowing or the like.

The method in accordance with the invention can be further developed in a similar manner and shows similar advantages in so doing. Such advantageous features are described in an exemplary, but not exclusive manner in the subordinate claims dependent on the independent claims.

Figure 3:
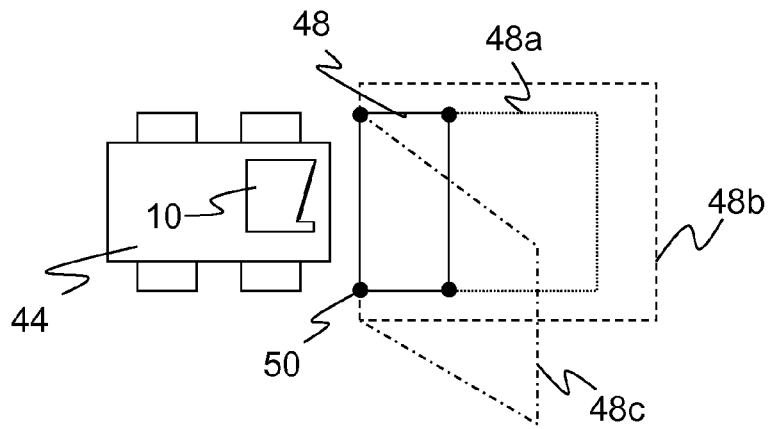
Figure 2:
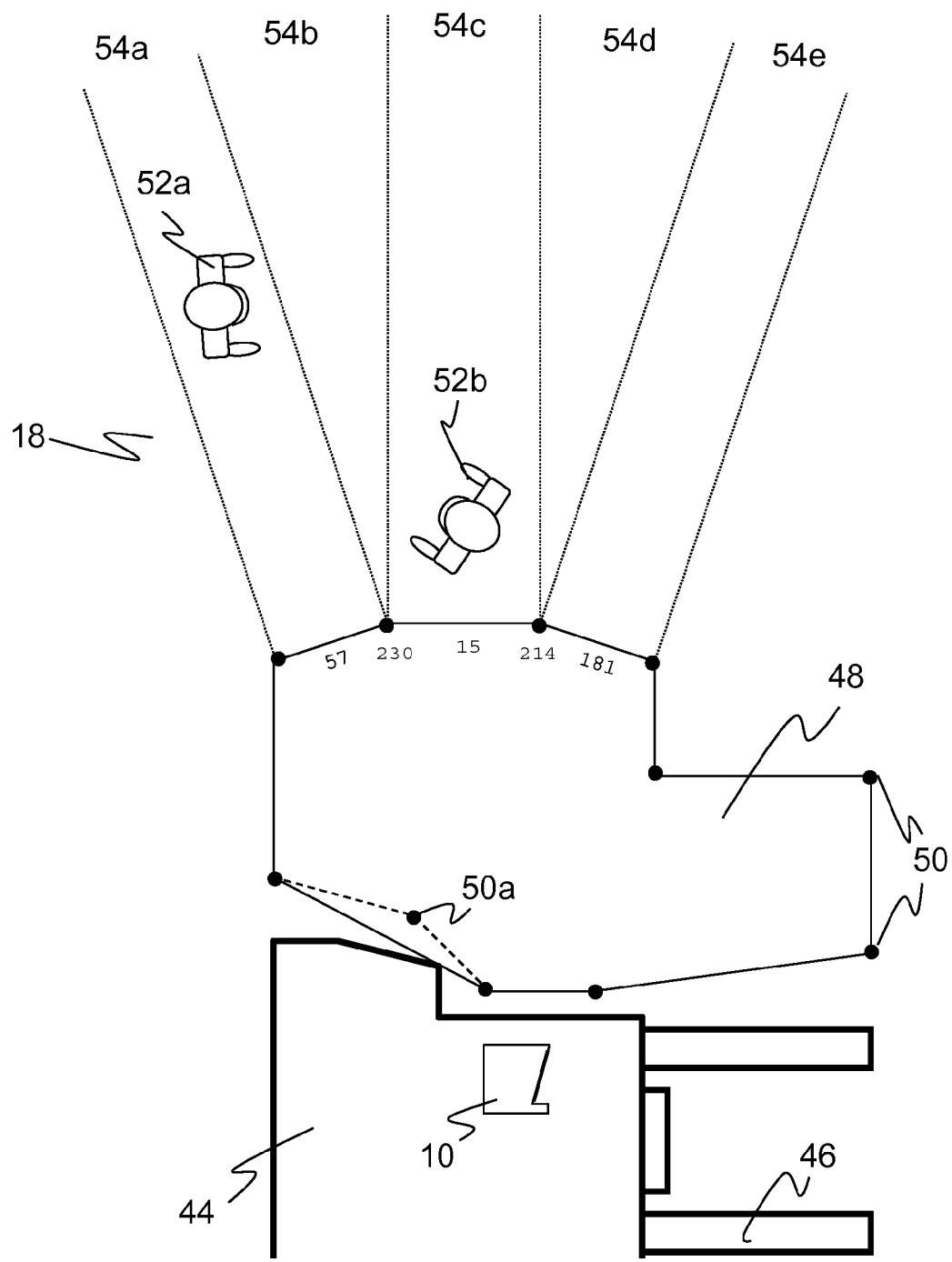
Figure 4:
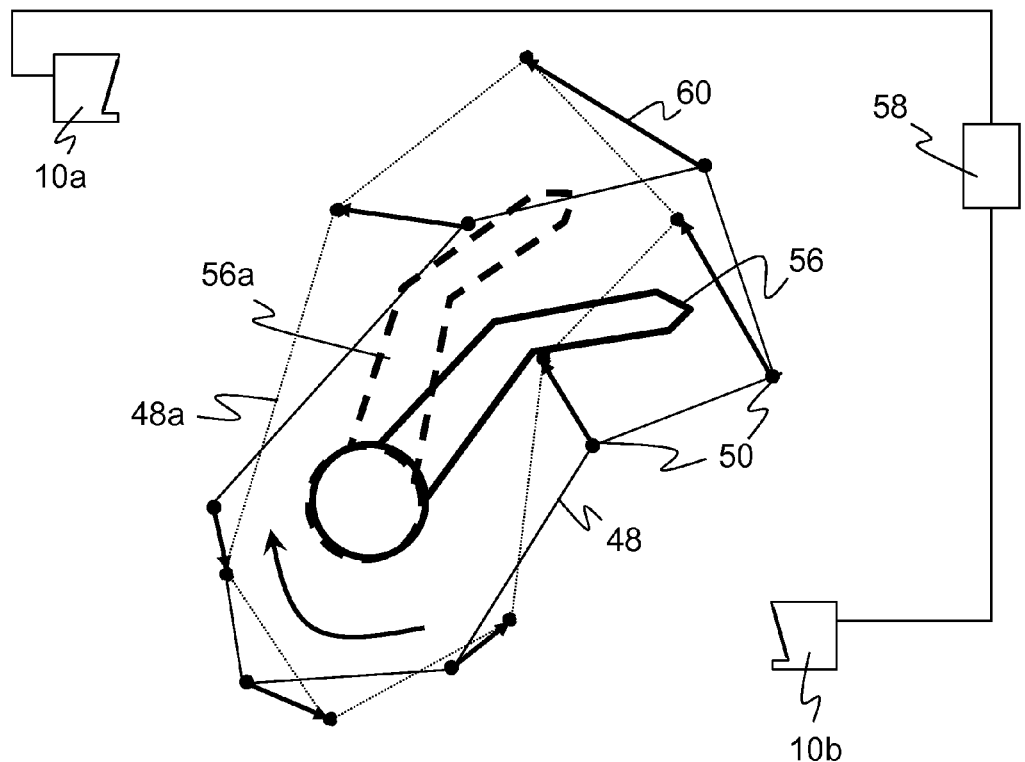
Figure 5:
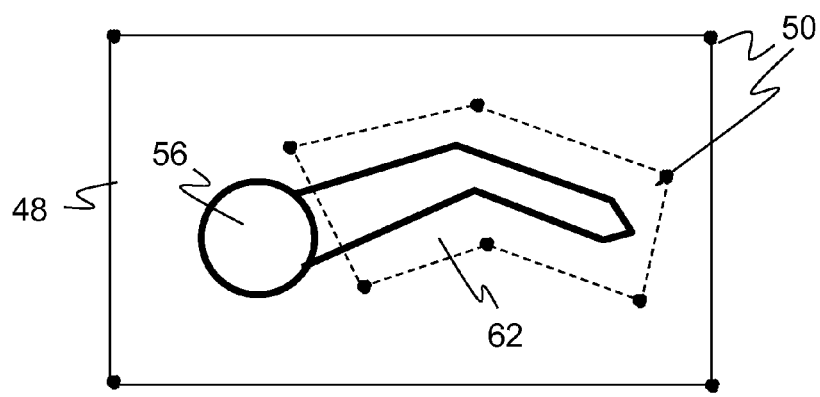

The invention will be explained in more detail in the following also with respect to further features and advantages by way of example with reference to embodiments and to the enclosed drawing. The Figures of the drawing show in:

FIG. 1 a schematic sectional representation of a safety scanner in accordance with the invention;

FIG. 2 a plan view of a safety sensor in accordance with FIG. 1 mounted on a vehicle as well as of its protected field and monitored zone;

FIG. 3 a plan view of a vehicle having a safety sensor in accordance with FIG. 1 mounted thereon to explain protected zone adaptations;

FIG. 4 a plan view of a system of two safety sensors and a robot arm together with adapted protected field; and FIG. 5 a plan view of a robot arm with a protected zone to secure it and with a further mute protected zone to utilise measuring functions.

FIG. 1 shows a schematic sectional representation through a safety laser scanner 10 in accordance with the invention. The invention will be described for this example, but also includes distance measuring optoelectronic safety sensors including the 3D cameras and scanning light grids briefly described in the introduction.

A light beam 14 which is generated by a light transmitter 12, for example by a laser, and which has individual light pulses is directed into a monitored zone 18 via light deflection units 16a-b and is there remitted by an object which may be present. The remitted light 20 again arrives back at the safety scanner 10 and is detected there by a light receiver 24, for example a photodiode, via the deflection unit 16b and by means of an optical receiving system 22.

The light deflection unit 16b is made as a rule as a rotating mirror which rotates continuously by the drive of a motor 26. The respective angular position of the light deflection unit 16b is detected via an encoder 28. The light beam 14 generated by the light transmitter 12 thus sweeps over the monitored zone 18 generated by the rotational movement. If a reflected light signal 20 received by the light receiver 24 is received from the monitored zone 18, a conclusion can be drawn on the angular position of the object in the monitored zone 18 from the angular position of the deflection unit 16b by means of the encoder 28.

In addition, the tight of flight of the individual laser light pulses is determined from their transmission up to their reception after reflection at the object in the monitored zone 18. A conclusion is drawn on the distance of the object from the safety laser scanner 10 from the time of flight of light while using the speed of light. This evaluation takes place in an evaluation unit 30 which is connected for this purpose to the light transmitter 12, to the light receiver 24, to the motor 26 and to the encoder 28. Two-dimensional polar coordinates of all objects in the monitored zone 18 are thus available via the angle and the distance.

The evaluation unit 30 has a protected zone intrusion recognition unit 32 which checks whether an unauthorised object is intruding into a protected zone. If this is the case, a securing signal is output via a safety output 34 (POSSD, output signal switching device) to a monitored source of danger, for example to a machine. A distance determining unit 36 is provided as a further sub-unit in the evaluation unit 30 and determines the distance from the monitored protected fields for detected objects in the monitored zone 18. This distance information can be output via a data interface 38. Conversely, the evaluation unit 30 can receive data via the data interface 38, for example to fix protected zone boundaries. The protected zone intrusion recognition unit 32 and the distance determination unit 36 are connected to one another for an exchange of data, in particular to exchange protected zone boundaries. It is conceivable to combine the two outputs 34, 38 of the scanner to form a common safety interface.

All the named functional components are arranged in a housing 40 which has a front screen 42 at the front side, that is in the region of the light exit and of the light entry. The front screen 42 is slanted to avoid direct reflections into the light receiver 24 so that the light beam 14 and the front screen 42 include an angle other than ninety degrees.

FIG. 2 shows a vehicle 44 in a plan view on which a safety laser scanner 10 in accordance with the invention is mounted. In this respect, the same reference numerals here and in the following designate the same or mutually corresponding features. The vehicle 44 has a lateral transport apparatus 46, but is to be understood overall only as a replaceable example of a source of danger to be secured.

A two-dimensional protected field 48 is set up as the protected zone in the direction of travel of the vehicle 44. The protected field boundary is defined by a plurality of sampling points 50. Only these sampling points are configured by the user. This is done either in a configuration program by direct fixing of each sampling point 50 or the user is assisted in that he defines simpler parameters and sampling points are derived from them. For example, in this respect, specific protected field shapes are offered and are fixed further with a few parameters such as the protected field extent to the front or to the rear and the required sampling points are then selected automatically.

The evaluation unit 30 automatically generates all the required protected field boundaries from the sampling points 50 on the basis of their known own positions and orientations, that is it connects the sampling points 50 to a polygon series and converts the arising protected field 48 in the required angular and distance resolution into polar coordinates of the safety laser scanner 10.

In this respect, possible masking problems are automatically eliminated in the evaluation unit 30 and it is provided that the protected field 48 is free of objects, as is illustrated in FIG. 2 by a dashed line and an automatically added sampling point 50a.

The safety laser scanner 10 also detects objects 52a-b which are not located inside the protected field 48, but inside the monitored zone 18. The integrated measuring function of the distance determination unit 36 calculates the minimal distance from the protected field 48 for such objects 52a-b. For this purpose, a part region 54a-e is associated with each polygon series and each sampling point, with only some of these part regions 54a-e being drawn for reasons of clarity in FIG. 2.

The numbers beneath the part regions 54a-e illustrate the distances purely by way of example and in any desired units. A mean distance which indicates the object distance perpendicular to the associated polygon series is output in the part region 54a due to the object 52a. This applies accordingly to the part region 54c in which the object 52b is much closer to the associated polygon series. Distances are calculated radially from the sampling points which are associated with the part regions 54*b*, 54*d*; however, in this example as in the part region 54*e*, only objects are detected there at a distance which is no longer shown in FIG. 2. A maximum distance encodes that no object 52 is detected in this direction, whereas a negative distance indicates the depth an object 52 is intruding into the protected field 48.

In addition to the distance data of a current instantaneous shot, retrospective measured data are also output. The speed of the objects 52*a-b* can, for example, also be estimated very easily with reference to distance changes and even an object tracking can be realised in that the distances within the part regions 54*a-e* are continuously tracked and a check is made on a transition into a different part region 54*a-e* whether, instead of the vanished object 52 in the one part region 54*a-e*, a new object 52 appears in the other part region 54*a-b* at a distance plausible for the transition.

FIG. 3 again shows a vehicle 44 with a safety laser scanner 10 mounted thereon in a plan view. A protected field 48 disposed at the front in the direction of travel is only defined by the user with reference to the four sampling points 50 as a minimal configuration which fixes the fundamental design. The sampling points 50 can be changed via the data interface 38 during the operation. For example, for a protected field 48*a* at higher speed, the two distant sampling points are pushed forward to have a bigger safety buffer in the direction of travel. The size in all directions is scaled up in order also to have greater lateral security for a protected field 48*b*. For a protected field 48*c*, finally, the distant sampling points 50 are pushed laterally to the front, for example before a turning procedure.

In all of these dynamic protected field changes, only minimal data are to be transferred via the data interface 38, for example two displacement vectors to change from protected field 48 to protected field 48*c*. The protected fields 48, 48*c* themselves differ substantially from one another. The conversion takes lace automatically, however, and during the ongoing securing operation, in the evaluation unit 38. In dependence on the calculation power, this does not necessarily have to be done from one evaluation cycle to the other within the very short response time since securing is still possible using the previous protected field configuration for so long until the new protected field configuration is fully calculated.

Instead of warning fields, a vehicle control now receives the distance data of detected objects 52 from the protected field 48. On the basis of this, the speed can, for example, be reduced when an object 52 approaches the protected field 48. The distance data can, however, also be utilised independently of a safety function, for example to observe a desired distance from a side wall, to stop at the end of a corridor in good time or to adapt the speed automatically at constricted points.

FIG. 4 shows a system of two safety laser scanners 10*a-b* in accordance with the invention on a robot 56 in a plan view. By the combination of a plurality of safety laser scanners 10*a-b*, in contrast to only one safety laser scanner 10*a-b*, shadowed zones can be monitored and the field of view and the perspective can be generally improved. Both safety laser scanners 10*a-b* are connected to a common safety control 58 and all evaluation functions are distributed in any desired manner over the internal evaluation units 30 of the safety laser scanners 10*a-b* and the safety control 58. The detection data of the two safety laser scanners 10*a-b* can be converted into on another by a common registration in a common coordinate system. Effectively, a simple sensor with an improved field of vision arises by the system of the safety laser scanners 10*a-b* and the safety control 58. In this respect, part areas of a protected field to be monitored are distributed over the individual safety laser scanners 10*a-b* so that no shadowed areas or the like occur.

The planned movements of the robot arm 56 are known to the plant control. It is thus not necessary to secure the total potential radius of action of the robot arm 56, but quasi only to define and move an envelope around the robot arm 56 as a protected field 48. If, in the example shown, the robot arm rotates from the position 56 shown by a solid line into a position 56*a* shown by a dashed line, the protected field 48 is adapted to the protected field 48*a* by indication of displacements 60 of the sampling points 50 and is thereby moved with it.

The protected field 48*a* can also be checked in an advance accumulative manner to the protected field 48. An intrusion into the still not active protected field 48*a* does not result in an emergency stop, but is a warning for the robot control that the planned movement will in all likelihood be aborted so that corresponding replanning or braking maneuvers can be carried out.

FIG. 5 shows a robot arm 56 in a plan view which is secured by an enveloping protected field 48. Due to its simple geometry, the distance data with respect to objects 52 are only resolved correspondingly coarsely and are therefore only suitable with limitations for automation functions such as a control of the real movement of the robot arm 56 over the intended movement. On the other hand, the shape of the protected field 48 should as a rule be determined by the safety function and not by additional demands. To decouple this, an additional, so-called mute protected field or measuring field 62 is provided. It nestles substantially more closely to the robot arm 56 and follows its contour in a manner not necessarily sufficient for the avoidance of accidents.

Intrusions into the measuring field 62 are possibly registered, but do not result in a safety directed shutting down. The distance data, that is, for example, one respective perpendicular distance value per curve series and one radial distance value per sampling point 50, are, however, determined and output as with a protected field 48. A combination of protected fields 48 and measuring fields 60 can therefore be utilised for the purpose that the distance determination unit 36 provides suitable data both for the safety function and for automation work.

The invention thus overall provides a possibility for the user to define protected fields 48 geometrically in a simple manner and to change them dynamically to the time of flight. In this respect, the protected field 48 simultaneously includes an integrated measuring function to determine spatial distances between protected fields 48 and really measured objects 52 in desired directions. A tool for communication with the safety sensor 10 arises which communicates between the conventional approaches, either to output only the complete raw data for the further processing and to accept complete protected field definitions with a very simple sensor or completely to automate the protected field definition and dynamic adaptation to data of a machine control with a sensor of very complicated design. A safety system which is highly flexible and simple to operation with little exchange of data and which simultaneously supports automation functions arises in that distance data preprocessed In accordance with the invention are output and both these distance data and protected fields to be configured initially and to be changed dynamically are related to the simple grid network of the sampling points.

Although the invention is described with reference to individual embodiments and representations, they are not to be understood as isolated from one another, but mixed forms are possible. A system comprising a plurality of safety laser scanners 10a-b is thus, for example, not limited to the monitoring of a robot arm and the dynamic protected field adaptations can be combined with a distance measurement from the protected field boundaries, although both functions are explained after one another with reference to FIG. 2 and FIG. 3.

The invention claimed is:

1. A distance measuring optoelectronic safety sensor (10) for monitoring a monitored zone (18) having at least one protected zone (48), comprising:
   a light receiver (24) for generating a received signal on light reception from the monitored zone (18) and
   an evaluation unit (30, 32) configured to detect objects (52) in the monitored zone (18) with the aid of the received signal, configured to determine position information of the detected objects, including the distance of the detected objects from the safety sensor (10), and configured to transmit a securing signal to a monitored machine on recognition of an unpermitted object intrusion (52) into a protected zone (48), and
   wherein the evaluation unit (30, 36) is further configured to determine the distance between the detected objects (52) and the protected zone (48), configured to transmit the determined distance between the detected objects and the protected zone (48) to a control, and configured to use the determined distance between the detected objects and the protected zone to decide whether to initiate a warning function.

2. A safety sensor (10) in accordance with claim 1, wherein the protected zone (48) is a two-dimensional protected field with a boundary configured to be defined for the evaluation unit (30) with reference to sampling points (50) and to curve series, in particular as a polygon series, connecting the sampling points (50).

3. A safety sensor (10) in accordance with claim 2, wherein the evaluation unit (30) is configured to determine and transmit the distance between the detected objects (52) and the protected zone (48) only once per curve series and/or only once per sampling point (50).

4. A safety sensor (10) in accordance with claim 2, wherein the evaluation unit (30) is configured to add further sampling points (50) to the sampling points (50) automatically or to remove sampling points (50) automatically.

5. A safety sensor (10) in accordance with claim 1, wherein changes in the position of sampling points (50), new sampling points (50) and/or sampling points (50) to be removed are configured to be defined for the evaluation unit (30) during the ongoing securing operation so that the evaluation unit (30) thereupon continues to work with the thus newly generated protected zone (48).

6. A safety sensor (10) in accordance with claim 1, wherein the protected zone is a three-dimensional protected area zone with a boundary configured to be defined for the evaluation unit (30) using a triangular net, with the evaluation unit (30) configured to output the spacing of detected objects (52) from the protected area zone only once per triangle, or with additional triangles, amended triangles or triangles to be removed, all of which are configured to be defined for the evaluation unit (30) during the ongoing securing operation.

7. A safety sensor (10) in accordance with claim 1, wherein the evaluation unit (30) is configured to output speeds at which the detected objects (52) approach the protected zone (48) or move away from the protected zone (48).

8. A safety sensor (10) in accordance with claim 1, wherein the evaluation unit (30) is configured to treat at least one protected zone (48) as a mute protected zone (60), the mute protected zone treated as a purely measuring zone in which no evaluation for unpermitted object intrusions (52) takes place for the mute protected zone (60).

9. A safety sensor (10) in accordance with claim 1, wherein the safety sensor is a 3D camera, a distance measuring safety laser scanner or a scanning light grid.

10. A system of at least two optoelectronic safety sensors (10a-b) in accordance with claim 1, wherein the evaluation unit (30, 58) is designed to convert the perspectives of the safety sensors (10a-b) into one another.

11. A system in accordance with claim 10, wherein the evaluation unit (30, 58) is configured to distribute the protected zones (48) over the safety sensors (10a-b) so that no securing gaps arise.

12. A method for the monitoring of a monitored zone (18) having at least one protected zone (48), comprising:
   converting, in a safety sensor (10), light from the monitored zone (18) into a received signal,
   detecting objects (52) in the monitored zone (18) with the aid of the received signal,
   determining position information of the detected objects, including the distance of the detected objects from the safety sensor (10), and,
   on recognition of an unpermitted object intrusion (52) into a protected zone (48), transmitting a securing signal, and
   wherein the distance between the detected objects (52) and the protected zone (48) is determined, transmitted to a control, and used to decide whether to initiate a warning function.

13. A method in accordance with claim 12, wherein the protected zone (48) is a two-dimensional protected field with a boundary defined with reference to sampling points (50) and by a curve series connecting the sampling points (50), and wherein the distance between the detected objects (52) and the protected zone (48) is only determined and transmitted once per curve series and/or only once per sampling point (50).

14. A method in accordance with claim 13, wherein dynamically changed protected zones (48) are defined for the safety sensor (10) during the ongoing securing operation by instructions to change the position of sampling points (50), to add new sampling points (50) or to remove existing sampling points (50).

15. A method in accordance with claim 12, wherein at least one protected zone (60) is treated as a mute protected zone, the mute protected zone treated as a measuring zone in which only distances of detected objects (52) from the protected zone (48) are determined and output for the mute protected zone (60), and wherein but unpermitted object intrusions (52) are not recognised so that an intrusion into a mute protected zone (60) does not result in a securing signal.

* * * * *